US011975791B2

(12) United States Patent
Christ et al.

(10) Patent No.: US 11,975,791 B2
(45) Date of Patent: May 7, 2024

(54) ADJUSTABLE SEAT POST ARRANGEMENT

(71) Applicant: BMC Switzerland AG, Grenchen (CH)

(72) Inventors: Stefan Christ, Biel (CH); Jean-Martin Poncet, Diemerswil (CH); Peter Stämpfli, Kallnach (CH)

(73) Assignee: BMC SWITZERLAND AG, Grenchen (CH)

( * ) Notice: Subject to any disclaimer, the term of this patent is extended or adjusted under 35 U.S.C. 154(b) by 301 days.

(21) Appl. No.: 17/598,488

(22) PCT Filed: Mar. 18, 2020

(86) PCT No.: PCT/EP2020/057512
§ 371 (c)(1),
(2) Date: Sep. 27, 2021

(87) PCT Pub. No.: WO2020/193326
PCT Pub. Date: Oct. 1, 2020

(65) Prior Publication Data
US 2022/0185418 A1 Jun. 16, 2022

(30) Foreign Application Priority Data
Mar. 28, 2019 (CH) .................................. 00407/19

(51) Int. Cl.
B62J 1/08 (2006.01)
B62K 19/36 (2006.01)
F16F 9/02 (2006.01)
(52) U.S. Cl.
CPC ................. B62K 19/36 (2013.01); B62J 1/08 (2013.01); F16F 9/0263 (2013.01); B62J 2001/085 (2013.01)

(58) Field of Classification Search
CPC ............................ B62J 1/08; B62J 2001/085
See application file for complete search history.

(56) References Cited

U.S. PATENT DOCUMENTS 8,511,655 B2 * 8/2013 Wu ........................ B62K 19/36
248/161
10,358,180 B2 * 7/2019 Shipman .................. B62J 43/30
(Continued)

FOREIGN PATENT DOCUMENTS

CN 203623830 U 6/2014
CN 104773243 A 7/2015
(Continued)

OTHER PUBLICATIONS

International Search Report for PCT/EP2020/057512 dated May 25, 2020.
Written Opinion for PCT/EP2020/057512 dated May 25, 2020.

Primary Examiner — Rodney B White
(74) Attorney, Agent, or Firm — Pearne & Gordon LLP

(57) ABSTRACT

An adjustable seat post arrangement, including a seat post, a pneumatic cylinder, a pressure vessel, a control valve and a valve actuating means, wherein the seat post is operatively connected to a cylinder barrel of the pneumatic cylinder, wherein the pneumatic cylinder includes a first chamber, which is situated on one side of a piston, and includes an open second chamber, which is situated on an opposite side of the piston, wherein the control valve is actuatable by the valve actuating means, wherein compressed air can be fed from the pressure vessel via lines and the control valve to the first chamber, wherein a first line leads from the control valve to the first chamber, and wherein a pressure spring which acts on the piston is provided in the open second chamber.

13 Claims, 5 Drawing Sheets

(56) References Cited

U.S. PATENT DOCUMENTS

| | | | |
|---|---|---|---|
| 10,562,578 B2 * | 2/2020 | Teixeira | B62K 19/36 |
| 10,807,667 B2 * | 10/2020 | Shipman | B62J 43/30 |
| 11,136,083 B2 * | 10/2021 | Shirai | B62K 25/08 |
| 11,738,817 B2 * | 8/2023 | Shipman | B62J 43/23 |
| | | | 280/274 |
| 2004/0208687 A1 | 10/2004 | Sicz et al. | |
| 2011/0148067 A1 | 6/2011 | Haager | |
| 2013/0156492 A1 * | 6/2013 | Maier | B62J 1/08 |
| | | | 403/109.1 |
| 2017/0158281 A1 | 6/2017 | Hara et al. | |
| 2020/0140029 A1 * | 5/2020 | Shipman | B62J 1/08 |
| 2020/0247498 A1 * | 8/2020 | Yamamoto | B62J 50/22 |
| 2020/0269941 A1 * | 8/2020 | Hara | B62J 1/08 |
| 2021/0394850 A1 * | 12/2021 | Shirai | B62J 45/41 |
| 2022/0111919 A1 * | 4/2022 | Staples | B62J 1/08 |
| 2023/0023599 A1 * | 1/2023 | Coaplen | B62J 1/08 |

FOREIGN PATENT DOCUMENTS

| | | |
|---|---|---|
| DE | 874256 C | 4/1953 |
| JP | S5647374 A | 4/1981 |
| JP | H0375087 U | 7/1991 |
| TW | 201838863 A | 11/2018 |
| WO | 2019052654 A1 | 3/2019 |

\* cited by examiner

ADJUSTABLE SEAT POST ARRANGEMENT

TECHNICAL FIELD

The present invention relates to an adjustable seat post arrangement, in particular for bicycles.

STATE OF THE ART

It is known for adjustable seat post arrangements to have a pressure spring or a single-acting pneumatic cylinder, with which a seat post can be extended resp. raised. In order to retract the seat post again, the riders must sit on the saddle and push the latter down with their weight. A low position of the saddle is advantageous in particular on bumpy terrain, as it makes it possible to prevent the rider from colliding onto the saddle. If the driver is already on rough terrain, pushing down the saddle with one's rear is critical.

DESCRIPTION OF THE INVENTION

One aim of the present invention consists in proposing a seat post arrangement in which the saddle resp. the seat post can be retracted also on bumpy terrain without any risks. Furthermore, the arrangement should have a simple and weight-saving construction.

This aim is achieved with a seat post arrangement having the characteristics of claim 1. Further embodiments of the seat post arrangement, as well as of a bicycle frame including the inventive seat post arrangement, are defined by the characteristics of further claims.

An inventive adjustable seat post arrangement includes a seat post, a pneumatic cylinder, a pressure vessel, a control valve and a valve actuating means. The seat post and the pneumatic cylinder extend along a first axis. The seat post is operatively connected with a cylinder barrel of the pneumatic cylinder. The pneumatic cylinder comprises a first chamber, which is located on one side of a piston of the pneumatic cylinder, and an open second chamber, which is located on a second side of the piston opposite the first side. The control valve can be actuated via the valve actuating means. Compressed air is capable of being supplied from the pressure vessel via lines and the control valve to the first chamber, wherein a first line leads from the control valve to the first chamber. In the open second chamber, a pressure spring is provided which extends in the direction of the first axis and which acts on the piston. This construction has the advantage that the seat post can be retracted with a valve actuating means, without the user, i.e. the bicycle rider, needing to touch the saddle. The rider can thus freely decide when and how the saddle is to be lowered. The raising is achieved by means of the pressure spring, whereby no compressed air is used. A pressure reduction valve can be provided between the pressure vessel and the control valve, so that the pressure in the pneumatic cylinder is lower than in the pressure vessel, so that the consumption of compressed air is reduced. This construction can be applied to seat posts of different cross-sections, for example circular, oval or polygonal. The open second chamber comprises at least one opening and is thus always connected with the environment. In a further embodiment, the first line comprises a section that is routed through a piston rod of the pneumatic cylinder. This construction makes it possible to achieve a line routing inside the pneumatic cylinder, resp. inside the seat post. This requires fewer parts, makes the construction simpler and reduces the weight of the construction.

In one embodiment, with the control valve in a first end position and the control valve in a middle position, the first chamber is connected through the first line with the environment. In a second end position of the control valve opposite the first end position, the first chamber is connected via the first line and a supply line with the pressure vessel.

In a further embodiment, the valve actuating means comprise a user-operated control element and a power transmission, with which a force generated by the user on the control element can be transmitted to the control valve in order to actuate the latter. The control element can be arranged on the bicycle handlebars or on the bicycle frame in an area close to the steering, thus ensuring good access and ease of operation for the user resp. the rider.

In a further embodiment, the power transmission comprises a Bowden cable or a pressure line. Bowden cables or pressure lines are conventional elements for transmitting forces on a bicycle. They have a long service life and work reliably. Bowden cables have the advantage that they can transmit both pulling forces as well as pushing forces.

In one embodiment, at least one spring is provided which can act on the control valve and can press the latter along the first axis into a predetermined position. It is possible to combine the Bowden cable with springs, in order to be able to generate a return force when actuating the Bowden cable. For example, a spring can be provided that can generate a return force only in one direction. In this case, it would be possible instead of the Bowden cable to use only one cable which can transmit essentially only pulling forces. If the cable is pulled for example by means of a lever, the spring is compressed and the return force increases accordingly. If the lever is released, i.e. the pulling force on the cable is reduced, the spring force causes the lever to return. If the lever and accordingly also the control valve are meant to remain in a particular position, it is possible to provide latching elements. In this case, it is necessary to disengage the lever to be able to deflect it away from the predetermined position.

In a further embodiment, the valve actuating means comprise a user-operated control element, a valve actuating means and a wireless signal transmission, with which a signal generated by the user with the control element can be transmitted to the valve actuating means and through which the control valve can be actuated. A wireless signal transmission requires no routing of lines inside or outside the frame. This is advantageous as internal routing of the lines weakens the frame and makes it heavier due to additional reinforcements, and an external routing of lines results in an increased air resistance due to the vortex formation on the lines during the drive.

In a further embodiment, the control element comprises a lever, a rotary ring, such as is used for example in a Gripshift shifter, at least one switch or at least two push buttons. However, any operating or switching element can be used that allows at least three positions (locked, free, retracted) can be selected. It is also possible to use several control elements, with which together the at least three positions resp. states can be selected. The control elements are generally designed in such a way that they can be operated resp. actuated easily by the driver. The manipulation can occur with one hand or both hands. For example, a lever can be provided in the area of the handle of the bicycle handlebars, or for example one or two buttons for locking and releasing the seat post can be placed in the area of a first handle of bicycle handlebars and a second button for retracting can be placed in the area of a second handle of the bicycle handlebars.

In a further embodiment, the seat post arrangement further comprises a locking device, wherein the locking device comprises a locking bolt and an adjusting element. In a fixing position of the adjusting element, the locking bolt can engage in a position bore of the seat post. The locking bolt and the adjusting element are designed such that a displacement of the adjusting element out of the fixed position in the direction of a first axis parallel to the longitudinal axis of the pneumatic cylinder results in a displacement of the locking bolt in a second axis perpendicular to the first axis.

In one embodiment, the seat post arrangement further comprises a locking device. The locking bolt comprises a locking device and an adjusting element, which are designed such that a displacement of the adjusting element along the first axis results in a displacement of the locking bolt in a second axis perpendicular to the first axis. The locking bolt is arranged in a fixed position in a position bore of the seat post and the locking bolt is arranged in a release position outside of the position bores. This is a compact construction that allows the locking device to be housed completely inside the seat tube. This reduces the susceptibility to dirt and the arrangement inside the frame reduces the air resistance during the ride. For example, the adjusting element can comprise a guide groove in which a guide pin of the locking bolt can be inserted.

In a further embodiment, the adjusting element is operatively connected with an actuating element of the control valve, so that the adjusting element can be actuated at the same time as when the actuating element is actuated. The combination of both elements allows a compact construction with a low number of elements involved.

In one embodiment, in an initial position of the control element, the control valve occupies the first end position and the locking bolt occupies the fixing position. In a first position of the control element, the control valve occupies the middle position and the locking bolt occupies the release position. In a second position of the control element, the control valve occupies the second end position and the locking bolt occupies the release position.

The mentioned embodiments of the seat post arrangement can be used in any combination, provided they do not contradict each other.

In a bicycle frame with an inventive seat post arrangement, the seat post arrangement is fastened through a fastener in a seat tube of the bicycle frame. The fastener can be completely inside the tube or can be provided partly on the outside of the tube. For example, in a frame tube with a circular cross-section, it is possible to screw in a seat post arrangement with circular cross-section. This construction results in a lower air resistance during the drive. Alternatively, the seat post arrangement can be inserted into the frame tube and be fastened from outside with screws or bolts or similar mechanisms in respect of the tube's longitudinal direction. For example, this practice can be applied to tubular frames resp. seat post arrangements with non-circular cross-sections.

In a further embodiment, the fastener is arranged on the control valve of the seat post arrangement. Thus, no additional element is required for fastening resp. Fixating, which reduces the construction size and the weight of the construction.

In a further embodiment, the pressure vessel is formed together in one piece with a down tube of the frame. Thanks to this construction, the weight can be reduced and no unnecessary vortex formations will arise during the drive, which increase the drag resp. the air resistance.

Alternatively, the pressure vessel can be fastened on the outside of the frame. This improves access and makes it easier to replace the pressure vessel. It is also possible to provide more than one pressure vessel on resp. within the frame, in order to increase the overall volume of the fluid under pressure.

In a further embodiment, the lines and/or the power transmission can be at least partially inserted inside the frame. This reduces the susceptibility to damage and reduces the air resistance during the drive.

The mentioned embodiments of the bicycle frame can be used in any combination, provided they do not contradict each other.

BRIEF DESCRIPTION OF THE FIGURES

Hereafter, embodiments of the present invention will be described in more detail on the basis of the figures. The latter serve only for illustrative purposes and are not to be interpreted in a restrictive manner. The figures show.

DETAILED DESCRIPTION OF THE INVENTION

Figure 1:
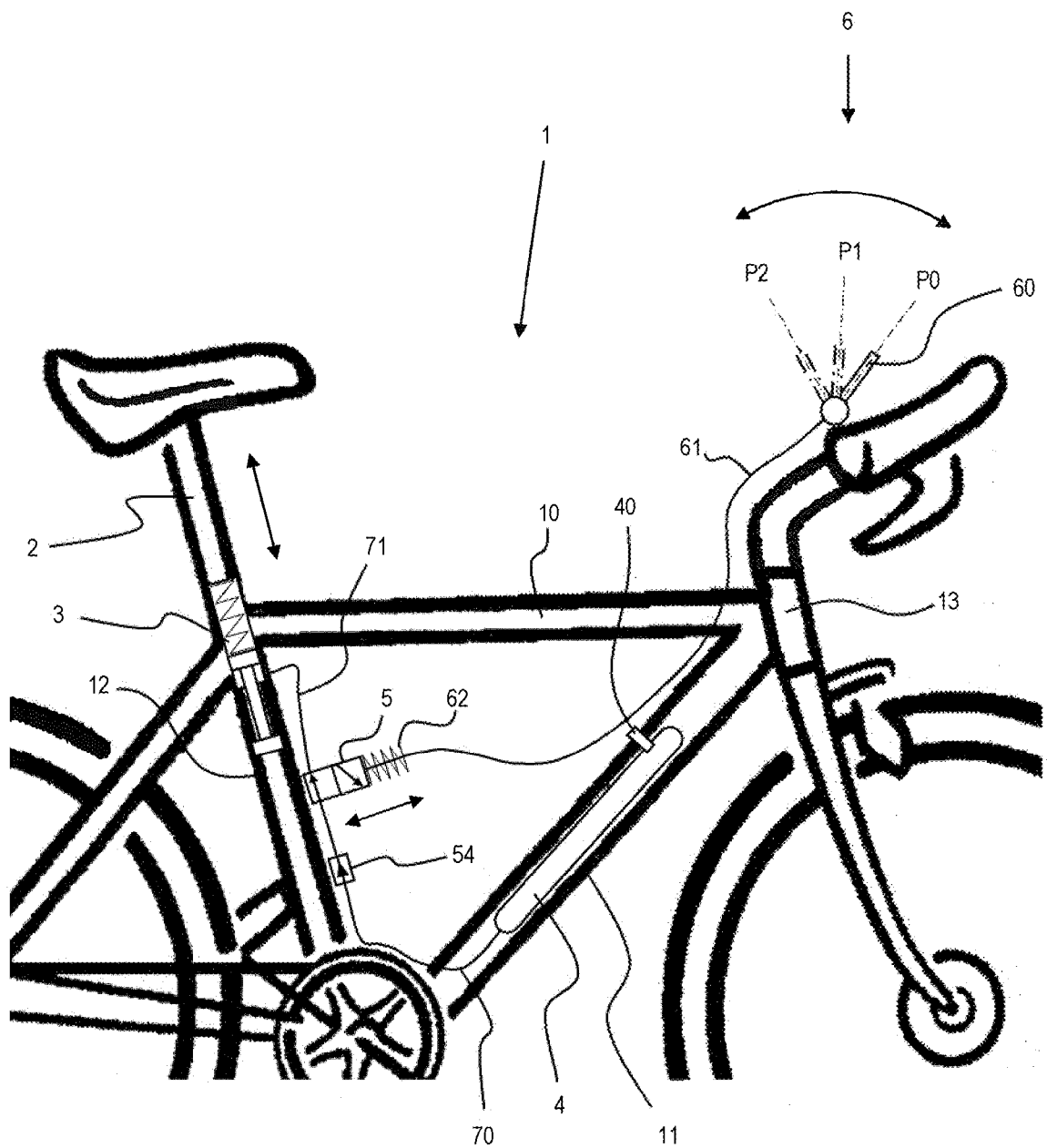
FIG. 1 a diagrammatic side view of an inventive adjustable seat post arrangement in a bicycle frame.

FIG. 1 shows a diagrammatic side view of an inventive adjustable seat post arrangement in a bicycle frame 1. The bicycle frame 1 has a top tube 10, a down tube 11, a seat tube 12 and a head tube 13, which are connected to one another. The seat post arrangement has a seat post 2, a pneumatic cylinder 3, a pressure vessel 4, a control valve 5 and a valve actuating means 6. The seat post 2 is operatively connected with the pneumatic cylinder 3. Compressed air can be supplied from the pressure vessel 4 via the lines 70; 71 and the control valve 5 to the pneumatic cylinder 3. A pressure reduction valve 54 is provided between the pressure vessel 4 and the control valve 5. The control valve 5 can be actuated via the valve actuating means 6. The pneumatic cylinder 3 is single-acting and is provided with a return pressure spring. A first line 71 leads from the control valve 5 to the pneumatic cylinder 3. A supply line 70 leads from the pressure vessel 4 to the control valve 5. The pressure vessel 4 can be filled with compressed air via a filler valve 40. The illustration shows a pressure vessel 4 which is arranged on the inside of the down tube 11 and the filler valve 40 protrudes out of the down tube 11 on its side directed upwards. The valve actuating means 6 has a control element 60 in the form of a swivelling lever 60 and a power transmission 61 in the form of a Bowden cable and is arranged with an end fastener 62 onto the control valve 5. With one movement of the lever 60 and of the Bowden cable 61, it is possible to actuate the control valve 5. In an initial position P0 of the lever 60, the control valve 5 is in a first end position, in which the first line 71 is closed by the control valve 5. In a first position P1 of the lever 60, the control valve is in a middle position, in which the first line is closed by the control valve 5. In a second position P2 of the lever 60, the control valve 5 is in a second end position, in which compressed air can be supplied from the pressure vessel 4 via the supply line 70, the control valve 5 and the first line 71 to the pneumatic cylinder 3.

Figure 2:
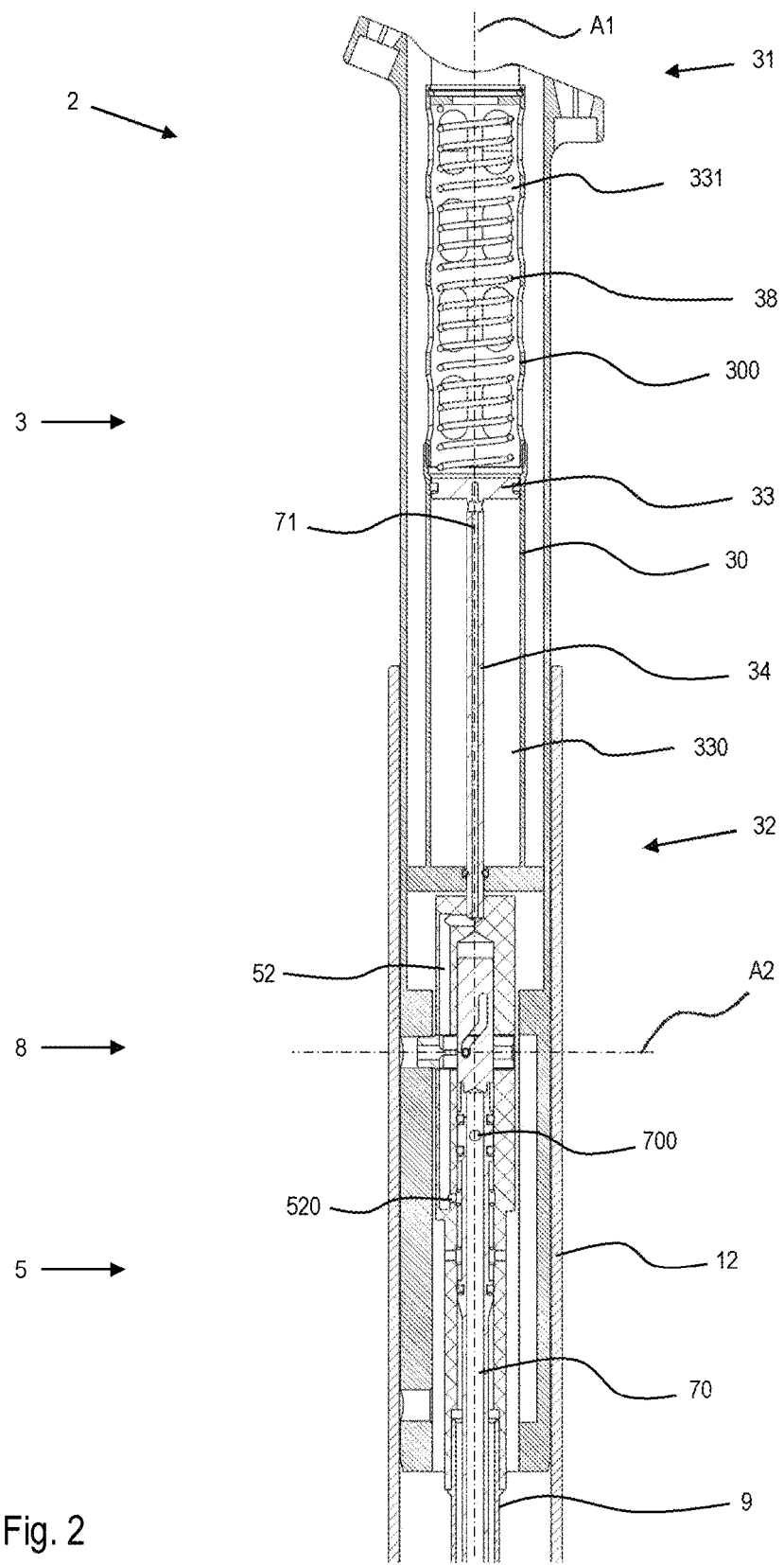
FIG. 2 a side cross-section view through an inventive seat post arrangement in a retracted and locked state.
Figure 3:
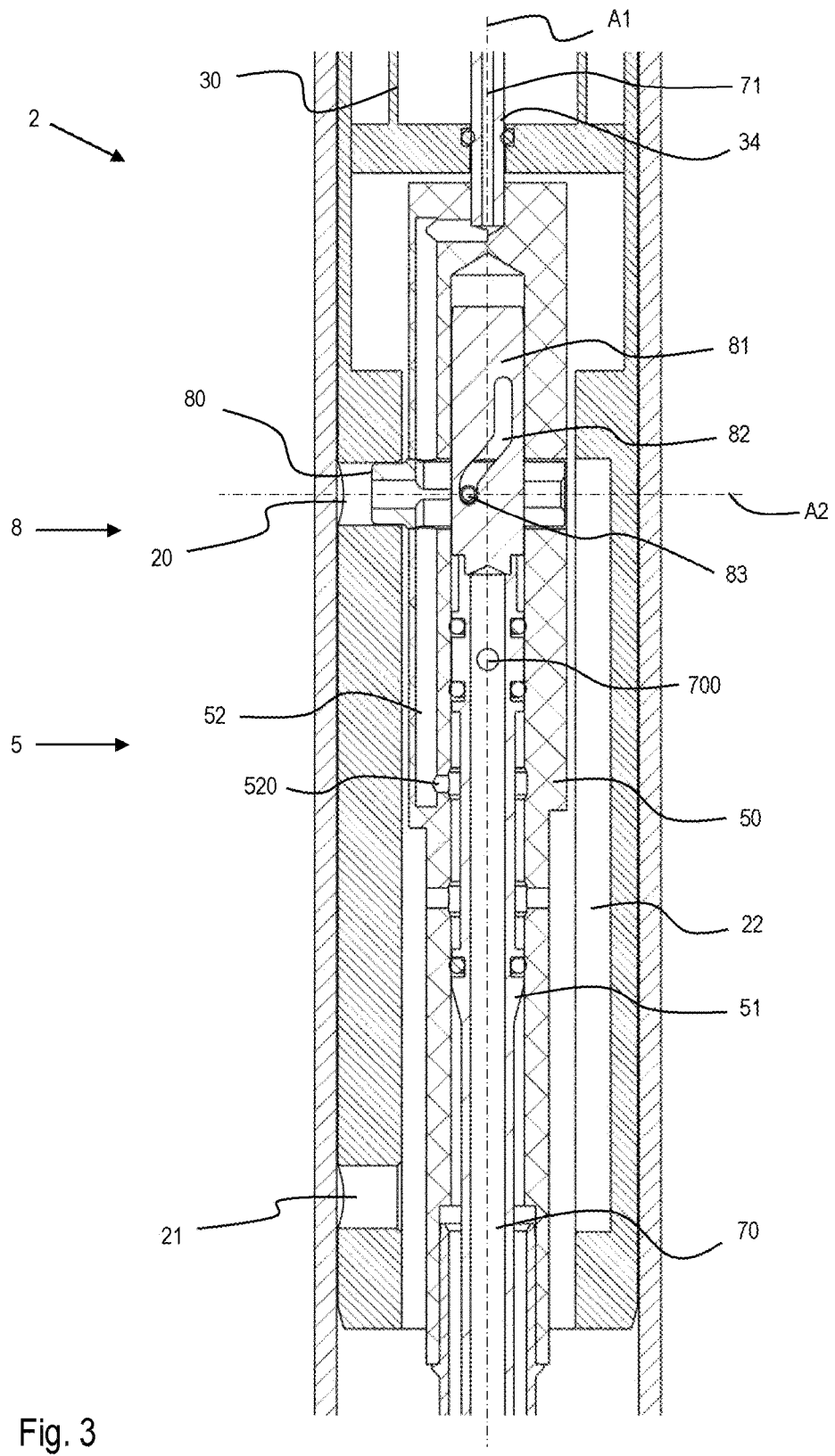
FIG. 3 an enlarged view of the control valve and of the locking device of FIG. 2.

FIG. 2 shows a side cross-section view through an inventive seat post arrangement in a retracted and locked state and FIG. 3 shows an enlarged view of the control valve 5 and of the locking device of FIG. 2. The illustration shows a tubular shaped seat post 2, in which a pneumatic cylinder 3, a control valve 5 and a locking device 8 are arranged. The control valve 5 is fastened through a fastener 9, in the form of a sleeve, on a seat tube 12 of the bicycle frame. The seat post 12 is arranged in a displaceable manner along a first axis A1 in the seat tube 12. The first axis A1 corresponds to the longitudinal axis of the seat tube 12 resp. of the seat post 2. On the side of the seat post 2 furthest in relation to the seat tube 12 are screw accommodations for fastening a bicycle saddle. The pneumatic cylinder 3 comprises a cylinder barrel 30 arranged concentrically inside the seat post 2 and permanently connected with it. An open cylinder head 31 is located on the side of the seat post 2 which is not inserted into the seat tube 12. A cylinder base 32 is located on the side of the cylinder barrel 30 opposite the cylinder head 31. Between the cylinder head 31 and the cylinder base 32, there is a cylinder piston 33, which can be displaced tightly along the first axis A1. The cylinder piston 33 divides the cylinder barrel into a first chamber 330 and an open second chamber 331. The cylinder piston 33 is connected with a piston rod 34, which is inserted tightly through an opening in the cylinder base 32. The piston rod 34 is connected with the control valve 5 on the side of the cylinder base 32 opposite to the cylinder piston 33. In the outwardly open second chamber 331, a pressure spring 38 is arranged which acts along the first axis A1 on the cylinder head 31 and on the cylinder piston 33. A spring housing 300 is arranged on the cylinder barrel 30 flush with it and includes an open part of the second chamber 331. In the retracted state of the seat post 2 illustrated, the second chamber 331 comprises essentially only the inner space of the spring housing 300. Openings are provided in the shell surface of the spring housing 300 that allow air to flow into or out of the second chamber 331. The control valve 5 comprises a tubular shaped valve body 50 and a valve tappet 51 arranged concentrically therein. The piston rod 34 is connected with the valve body 50. The valve tappet 51 is arranged in a displaceable manner in the direction of the first axis A1 in the valve body 50. The valve tappet 51 is tubular in shape and has concentrically on its inside the supply line 70. A first channel 52 extends inside the valve body 50 parallel to the valve tappet 51 from a middle area of the valve body 50 until its end area, on which the piston rod 34 is fastened. In the valve tappet 51, a radially oriented bore 700 is provided which leads from inside the tappet 51 outwards. In the first channel 52, a radially oriented bore 520 is provided which connects the first channel 52 with the accommodation of the tappet 51. Gaskets are provided on the tappet 51 at a distance to the bore 700 on both sides in relation to the first axis A1. One end of the valve tappet 51 oriented against the pneumatic cylinder 3 comprises an adjusting element 81 of the locking device 8. The adjusting element 81 comprises a guide groove 82, into which can be inserted an adjusting element 83 of a locking bolt 80 of the locking device 8. The guide groove 82 extends essentially in the direction of the first axis A1 over an area of the adjusting element 81. The guide groove 82 extends from an area at a distance to the first axis A1 in a first section parallel to the first axis A1, in a second section at an angle from the first section to an area at a distance from the first axis A1, which is opposite the first area in relation to the first axis A1. The first section has a length that corresponds essentially to the dimensions of the adjusting element 83. The second section extends essentially under an angle of 45° in relation to the first axis A1. The length of the third section is a multiple of the length of the first section. The locking bolt 80 extends along a second axis A2 perpendicular to the first axis A1. The locking bolt is essentially cylindrical and has a recess that extends over an area of the length of the locking bolt 80 through the latter. The two remaining parts of the locking bolt 80 on the side of the recess form an accommodation for a guide pin 83. The guide pin 83 extends diagonally to the recess through the latter. The guide pin 83 is designed so it is capable of being inserted into the guide groove. In the represented fixed position, the locking bolt 80 protrudes on one side over the circumference of the valve body 50 and engages in a position bore 20 in the seat post 2. The position bore 20 extends essentially along the second axis A2. A displacement of the adjusting element 81 from the first end position along the first axis A1 causes, through the design of the guide groove 82 and of the guide pin 83, a displacement of the locking bolt 80 in the direction of the second axis A2, whereby the latter is driven out of the position bore 20 and no longer protrudes on the side of the position bore 20 over the circumference of the valve body 50. After the displacement of the locking bolt 80, the latter protrudes on the side opposite the position bore 20 over the circumference of the valve body 50. On the side opposite the position bore 20, a recess 22 is provided in the seat post 2, in which the locking bolt 80 can be accommodated and displaced along the first axis A1. The recess 22 extends essentially along the first axis A1 over the area of all position bores 20, 21. The supply line 70 leads in a central tube to the control valve 5. The first line 71 comprises a first channel 52 in the control valve 5 and a channel section, which leads centrally through the piston rod 34 of the pneumatic cylinder 3, up to in front of its cylinder pistons 33, into the first cylinder chamber 330. In the represented first end position of the control valve 5, the bore 700 of the valve tappet 51 is arranged in the direction of the first axis A1 offset to the bore 520 of the first channel 52 of the valve body 50, whereby the first cylinder chamber 330 is separated by the control valve 5 from the supply line 70.

Figures 4A, 4B, 4C:
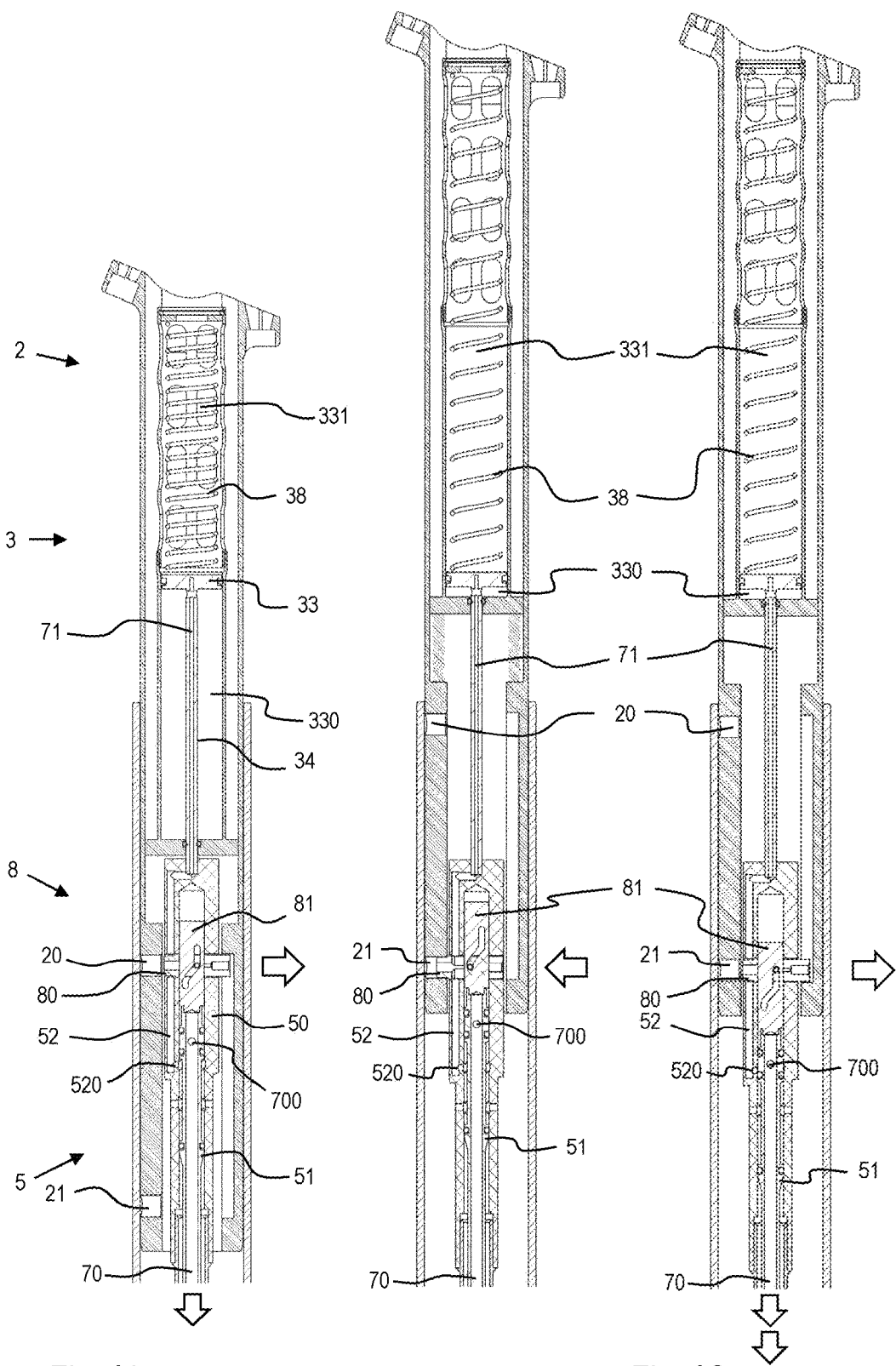
FIG. 4A the seat post arrangement of FIG. 2 in a retracted and unlocked state.
FIG. 4B the seat post arrangement of FIG. 2 in an extended and locked state.
FIG. 4C the seat post arrangement of FIG. 2 in an extended and unlocked state.

FIG. 4A shows the seat post arrangement of FIG. 2 in a retracted and unlocked state. By displacing the valve tappet 51 resp. the adjusting element 81 along the first axis A1 away from the pneumatic cylinder 3, the locking bolt 80 is displaced in the direction of the second axis A2 out of the position bore 20, as this has been described in detail in relation to FIG. 3. In the represented middle position of the control valve 5, air that is in the first chamber 330 can escape into the environment through the first line 71, i.e. through the channel in the piston rod 34, the first channel 52 and the bore 520. Due to the fact that the first chamber 30 has a connection to the environment and due to the fact that the spring 38 presses on the cylinder piston 33, the seat post 2 can travel autonomously upwards. After reaching the end position, which can be defined by a stop (not represented), the seat post 2 cannot be displaced further in the same direction. In the end position, the locking bolt 80 is oriented with the corresponding position bore 21. By displacing the adjusting element 81 resp. the valve tappet 51, into the first end position, the locking bolt 80 is displaced into the position bore 21, at the same time a connection is established between the first air chamber 330 and the environment. This is represented in FIG. 4B. FIG. 4B shows the seat post arrangement of FIG. 2 in the extended and locked position.

FIG. 4C shows the seat post arrangement of FIG. 2 in an extended and unlocked state. By displacing the valve tappet 51, resp. the adjusting element 81 away from the pneumatic cylinder 3, the locking bolt 80 is displaced out of the position bore 21. Simultaneously, compressed air is introduced from the supply line 70 over the control valve 5 and the first line 71 of the first pressure chamber 330. The pressure spring 38 is measured in such a way that it can overcome the own weight of the seat post 2, of a saddle fastened thereupon and of possible friction forces. The effective pressure in the first pressure chamber 330 is measured in such a way that the resulting effective force exerted on the cylinder piston 33 is greater than the maximum effective spring force. Accordingly, the seat post 2 is displaced downwards along the first axis A1 on the basis of the difference of the forces exerted in opposite ways on the cylinder piston 33. After reaching the end position, which can be defined by a stop (not represented), the seat post 2 cannot be displaced further in the same direction. In the end position, the locking bolt 80 is orientated with the corresponding position bore 20. By displacing the adjusting element in the first end position, the locking bolt 80 is displaced in the position bore 20, at the same time a connection is established between the first air chamber 330 and the environment. This is represented in FIG. 2. Obviously, it is also possible to design the adjusting element 81 resp. the valve tappet 51 so that a displacement of the adjusting element 81 in a direction opposite the pneumatic cylinder 3, i.e. upwards, leads to a displacement of the seat post 2 downwards. The extending and retracting resp. the raising and lowering of the seat post 2 can be repeated as often as the pressure of the compressed air stored in the pressure vessel 4 is sufficiently high, in order to generate a sufficiently large pressure force in the first pressure chamber 330 that acts on the piston 33 in order to overcome the friction and weight forces of the seat post and of the components attached thereto.

Figure 5:
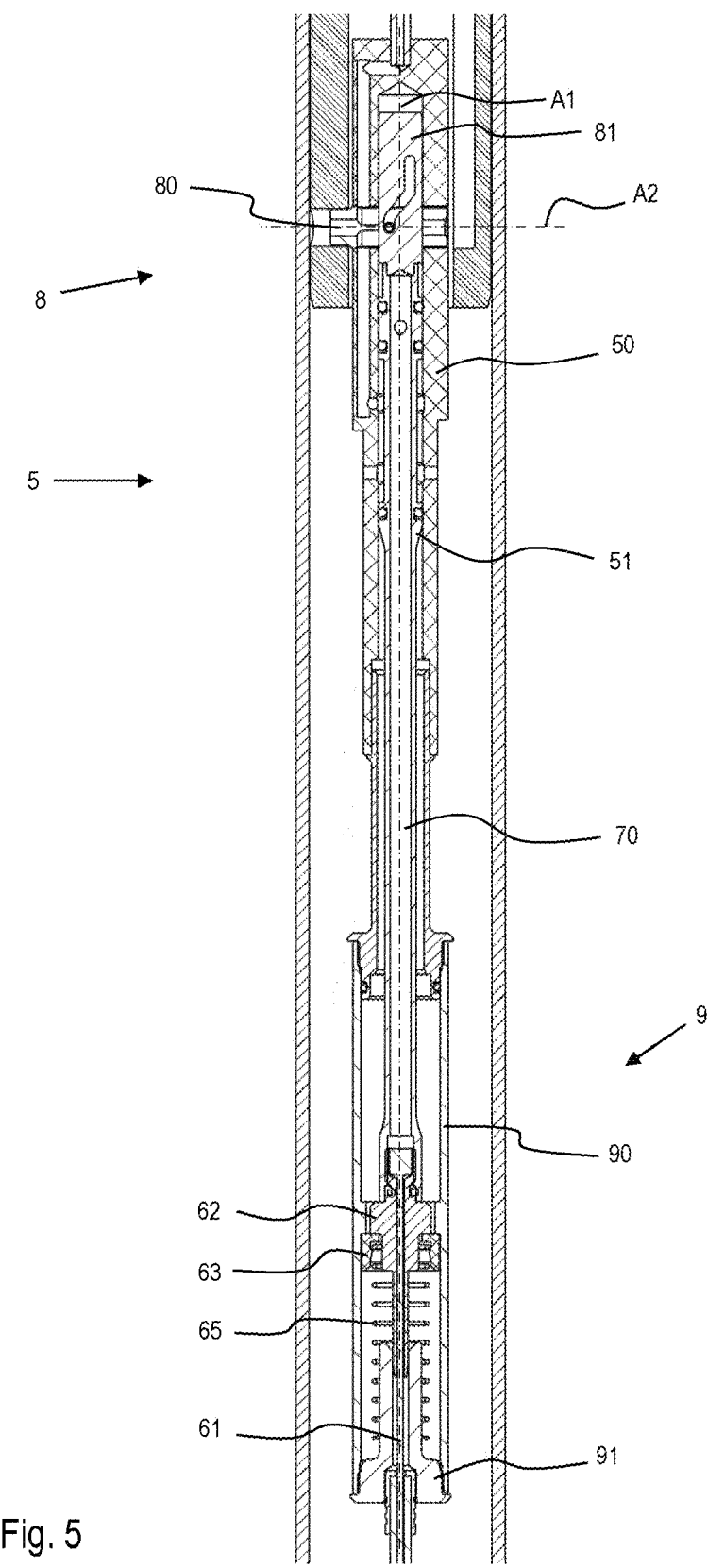
FIG. 5 a return mechanism for an inventive seat post arrangement.

FIG. 5 shows a return mechanism for an inventive seat post arrangement. At the free end of the valve tappet 51, which is opposite the adjusting element 81, an end fastener 62 for the power transmission 61, i.e. for the Bowden cable, is provided. The end fastener 62 is screwed into the valve tappet 51 with a threaded pin. A flange surrounding the first axis A1 abuts the front site of the valve tappet and extends laterally over the circumference of the valve tappet. On the side opposite the threaded pin, a pin is provided for accommodating and fastening the end part of the Bowden cable. On the side of the flange facing away from the valve tappet 51, a stop 63 is provided for a spring 65. The stop has a circular disc with a central through hole, on the circumference of which a collar extends from the disc in the direction of the first axis A1. The disc of the stop 63 abuts with its side opposite the collar onto the flange of the end fastener 62 and surrounds the pin for accommodating the Bowden cable. A spring 65 extends from the first stop 63 along the first axis A1. On the free end of the valve body 50, on its external side, a fastener 9 in the form of a fastening tube 90 is arranged. The fastening tube 90 has at both free ends an inner threading. With a first inner threading, the fastening tube is screwed onto the valve body 50. In the second inner threading, a tube plug 91 is screwed, with the tube plug 91 having a central through opening for the Bowden cable and a through opening placed next to it for a pressure line. The fastening tube 90 completely surrounds the end fastener 62, the stop 63 as well as the spring 65. For example, by pulling the Bowden cable 61, the end fastener 62 is displaced to the tube plug 91, whereby the first stop 63 is also displaced with it, whereby the spring 65 located between the tube plug 91 and the first stop 63 is compressed. When the Bowden cable is released, the end fastener 62 is pressed back into its original middle position.

LIST OF REFERENCE NUMBERS

| | |
|---|---|
| 1 | Bicycle frame |
| 10 | Top tube |
| 11 | Down tube |
| 12 | Seat tube |
| 13 | Head tube |
| 2 | Seat post |
| 20 | Position bore |
| 21 | Position bore |
| 22 | Recess |
| 3 | Pneumatic cylinder |
| 30 | Cylinder barrel |
| 300 | Spring housing |
| 31 | Cylinder head |
| 32 | Cylinder base |
| 33 | Piston |
| 330 | First chamber |
| 331 | Second chamber |
| 34 | Piston rod |
| 38 | Pressure spring |
| 4 | Pressure vessel |
| 40 | Filler valve |
| 5 | Control valve |
| 50 | Valve body |
| 51 | Valve tappet |
| 52 | First channel |
| 520 | Bore |
| 54 | Pressure reduction valve |
| 6 | Valve actuating means |
| 60 | Control element |
| 61 | Power transmission |
| 62 | End fastener |
| 63 | Stop |
| 65 | Spring |
| 70 | Supply line |
| 700 | Bore |
| 71 | First line |
| 8 | Locking device |
| 80 | Locking bolt |
| 81 | Adjusting element |
| 82 | Guide groove |
| 83 | Guide pin |
| 9 | Fastener |
| 90 | Fastening tube |
| 91 | Tube plug |
| A1 | first axis |
| A2 | second axis |
| P0 | initial position |
| P1 | first position |
| P2 | second position |

What is claimed is:

1. An adjustable seat post assembly comprising:
a seat post;
a pneumatic cylinder;
a pressure vessel;
a control valve;
a valve actuating means; and
a locking device,
wherein the seat post and the pneumatic cylinder extend along a first axis, wherein the seat post is operatively connected with a cylinder barrel of the pneumatic cylinder, wherein the pneumatic cylinder comprises a first chamber which is located on one side of a piston and an open second chamber which is located on an opposite side of the piston, wherein the control valve can be actuated via the valve actuating means, wherein compressed air is capable of being supplied from the pressure vessel via lines and the control valve to the first chamber, wherein a first line leads from the control valve to the first chamber and wherein a pressure spring is provided in the open second chamber which extends in the direction of the first axis and which acts on the piston, wherein the locking device comprises a locking bolt and an adjusting element, which are designed such that a displacement of the adjusting element along the first axis results in a displacement of the locking bolt in a second axis perpendicular to the first axis, wherein the locking bolt is arranged in a fixing position in a position bore of the seat post and wherein the locking bolt is arranged in a release position outside of the position bores, and wherein the adjusting element is operatively connected to an actuating element of the control valve so that the adjusting element can be actuated at the same time as when the actuating element is actuated.

2. The seat post assembly of claim 1, wherein the first line includes a portion extending through a piston rod of the pneumatic cylinder.

3. The seat post arrangement according to claim 1, wherein in a first end position of the control valve and in a central position of the control valve the first chamber is connected to the environment via the first line, and in a second end position of the control valve opposite to the first end position, the first chamber is connected to the pressure vessel via the first line and a supply line.

4. The seat post arrangement according to claim 1, wherein the valve actuating means comprises a control element which can be operated by a user and comprises a power transmission with which a force generated by the user at the control element can be transmitted to the control valve in order to actuate the control valve.

5. The seat post arrangement according to claim 4, wherein the control element comprises a lever, a rotary ring, at least one switch or at least two push buttons.

6. The seat post assembly according to claim 4, wherein the power transmission comprises a Bowden cable or a pressure line.

7. The seat post assembly according to claim 1, wherein the valve actuating means includes a user-operated control element, a valve actuating means and a wireless signal transmission, with which a signal generated by the user with the control element can be transmitted to the valve actuating means and through which the control valve can be actuated.

8. The seat post arrangement according to claim 1, wherein at least one spring is provided which can act on the control valve and can press the control valve along the first axis into a predetermined position.

9. The seat post arrangement according to claim 1, wherein in an initial position of the control element, the control valve occupies the first end position and the locking bolt occupies the fixing position, wherein in a first position of the control element, the control valve occupies the middle position and the locking bolt occupies the release position, and wherein in a second position of the control element, the control valve occupies the second end position and the locking bolt occupies the release position.

10. A bicycle frame with a seat post arrangement according to claim 1, wherein the seat post arrangement is fastened through a fastener on a seat tube of the bicycle frame.

11. The bicycle frame according to claim 10, wherein the fastener is arranged on the control valve of the seat post arrangement.

12. The bicycle frame according to claim 10, wherein the pressure vessel is formed together in one piece with a down tube of the frame.

13. The bicycle frame according to claim 10, wherein the lines and/or the power transmission can be at least partially inserted inside the frame.

* * * * *